(12) United States Patent
Hayes et al.

(10) Patent No.: US 8,340,830 B2
(45) Date of Patent: Dec. 25, 2012

(54) ONBOARD MANAGEMENT OF MOVABLE ASSET FOR ASSET PROTECTION

(75) Inventors: Jeremiah P. Hayes, Dublin (IE); Harry R. Kolar, Scottsdale, AZ (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/883,220

(22) Filed: Sep. 16, 2010

(65) Prior Publication Data

US 2012/0072038 A1   Mar. 22, 2012

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G05B 11/01* (2006.01)
*G05B 9/02* (2006.01)
*G08B 1/08* (2006.01)
*G08B 13/14* (2006.01)
*H04M 11/04* (2006.01)
*H04W 24/00* (2009.01)

(52) U.S. Cl. ....... 700/291; 700/22; 700/81; 340/539.13; 340/568.1; 455/404.2; 455/421; 455/456.1

(58) Field of Classification Search .............. 700/11, 700/21, 22, 79, 81, 286, 291; 705/7; 340/500, 340/532, 539.1, 539.12, 539.13, 540, 568.1; 455/73, 404.2, 421, 456.1, 456.3–456.6
See application file for complete search history.

(56) References Cited

U.S. PATENT DOCUMENTS

| | | | |
|---|---|---|---|
| 3,690,285 A | 9/1972 | Ellison | |
| 5,445,103 A | 8/1995 | Bleth et al. | |
| 6,747,556 B2* | 6/2004 | Medema et al. | 340/539.12 |
| 6,937,150 B2* | 8/2005 | Medema et al. | 340/539.12 |
| 7,171,187 B2* | 1/2007 | Haave et al. | 455/404.2 |
| 7,468,659 B2* | 12/2008 | Haave et al. | 340/539.13 |
| 7,711,256 B2* | 5/2010 | Wun | 396/56 |
| 7,801,506 B2* | 9/2010 | Haave et al. | 455/404.2 |
| 7,933,611 B2* | 4/2011 | Bocking et al. | 455/456.4 |
| 2008/0086349 A1* | 4/2008 | Petrie | 705/7 |
| 2008/0129491 A1* | 6/2008 | Ruperto | 340/539.13 |
| 2009/0186630 A1* | 7/2009 | Duff et al. | 455/456.3 |
| 2010/0216509 A1* | 8/2010 | Riemer et al. | 455/557 |
| 2010/0259386 A1* | 10/2010 | Holley et al. | 340/568.1 |
| 2010/0267361 A1* | 10/2010 | Sullivan | 455/404.2 |

OTHER PUBLICATIONS

IVS 3D, "AIS Tracking Drift Buoy Test", Copyright 2010, 2 pages.
"Amber Alert GPS", Copyright 2008-2010, 2 pages, https://www.amberalertgps.com/.
"AlarmBuoy", 1 page, screen shot taken Jun. 16, 2010, http://alarmbuoy.com/.

* cited by examiner

*Primary Examiner* — Crystal J Barnes-Bullock
(74) *Attorney, Agent, or Firm* — Yuanmin Cai; Hoffman Warnick LLC (57) ABSTRACT

A solution for managing an asset, such as a movable asset, deployed to a fixed location, is provided. Location and/or power information is periodically acquired for the asset and assessed to determine whether the asset has moved from a desired physical area and/or the power is insufficient to continue with planned operations. In response to either condition, the operation of various devices on the asset can be adjusted to minimize an inferred risk caused by the asset moving outside of the physical area and/or maximize an inferred probability of recovering the asset.

23 Claims, 5 Drawing Sheets

ONBOARD MANAGEMENT OF MOVABLE ASSET FOR ASSET PROTECTION

TECHNICAL FIELD

The disclosure relates generally to asset management, and more particularly, to managing a movable asset that is deployed to a physical location for operation.

BACKGROUND ART

Platforms that include various sensors for monitoring various aspects of a physical area are utilized in a variety of industries and applications. Such platforms can be located in water, suspended in the air (e.g., using a balloon), located in space, or located on land. Illustrative industries and applications for water-based platforms include, but are not limited to: oceanography (e.g., research), port operations, river management, offshore oil and gas exploration and production, environmental monitoring and protection, ocean energy devices (wave and tidal), offshore wind farm monitoring, weather stations, aquaculture, marine biology, water quality, navigational aids, monitoring buoys, research platforms, mineral extraction (e.g., ocean mining), drilling platforms, etc.

Frequently, such platforms are temporarily or permanently located in an area without any type of propulsion system. For example, water-based platforms can be located using undersea anchor(s), sinker(s) and tether(s), and/or the like. Additionally, such platforms also are commonly left unattended, perform their desired operations autonomously or semi-autonomously, and report data to remote locations. Still further, a platform can be self-powered, e.g., using batteries that can be charged by various ambient energy sources, such as photovoltaic solar panels, wind-driven generators, water (e.g., current or flow) driven generators, and/or the like.

A platform can become unsecured. In this case, the platform may stray from the physical area, e.g., due to currents, wind, drift, and/or the like. Such movement can present a risk to the platform and the safety of vehicles/vessels moving in the surrounding area, other assets located in the surrounding area, public safety, and/or the like.

SUMMARY OF THE INVENTION

Aspects of the invention provide a solution for managing an asset, such as a movable asset, deployed to a fixed location. Location and/or power information is periodically acquired for the asset and assessed to determine whether the asset has moved from a desired physical area and/or the power is insufficient to continue with planned operations. In response to either condition, the operation of various devices on the asset can be adjusted to minimize an inferred risk caused by the asset moving outside of the physical area and/or maximize an inferred probability of recovering the asset. The inferred risk can include consideration of one or more of: a risk of the asset being damaged; a risk of the asset damaging another object; a risk to the safety of humans/animals; a risk associated with the asset no longer collecting data according to the default operations; and/or the like.

A first aspect of the invention provides a method of managing an asset, the method comprising: operating a set of input/output (I/O) devices on the asset in a default mode of operation using a computer system located on the asset, wherein the asset is secured to a desired physical area and includes a power system configured to provide all power for operating devices on the asset; periodically evaluating location information for the asset using the computer system during the default mode of operation; and operating the asset in a protection mode of operation using the computer system in response to the evaluating indicating at least one of: the asset is located outside of the desired physical area or a current location of the asset cannot be determined, the operating the asset in the protection mode including: assessing current and projected power capabilities of the power component of the asset; assessing current and projected location information for the asset; operating the set of I/O devices on the asset based on the assessed power capabilities and location information to at least one of: minimize an inferred risk caused by the asset moving outside of the physical area or maximize an inferred probability of recovering the asset; and periodically repeating the assessing and operating actions.

A second aspect of the invention provides a system comprising: an asset secured to a desired physical area; a set of input/output (I/O) devices associated with the asset; a power system associated with the asset, wherein the power system is configured to provide all power for operating devices associated with the asset; and a computer system including at least one computing device associated with the asset, wherein the computer system is configured to manage the asset by performing a method including: operating the set of I/O devices in a default mode of operation; periodically evaluating location information for the asset during the default mode of operation; and operating the asset in a protection mode of operation in response to the evaluating indicating at least one of: the asset is located outside of the desired physical area or a current location of the asset cannot be determined, the operating the asset in the protection mode including: assessing current and projected power capabilities of the power component; assessing current and projected location information for the asset; operating the set of I/O devices based on the assessed power capabilities and location information to at least one of: minimize an inferred risk caused by the asset moving outside of the physical area or maximize an inferred probability of recovering the asset; and periodically repeating the assessing and operating actions.

A third aspect of the invention provides a computer-readable storage medium comprising program code embodied therein, which when executed, causes a computer system to implement a method of managing an asset, the method comprising: operating a set of input/output (I/O) devices on the asset in a default mode of operation, wherein the asset is secured to a desired physical area and includes a power system configured to provide all power for operating devices on the asset; periodically evaluating location information for the asset during the default mode of operation; operating the asset in a protection mode of operation in response to the evaluating indicating at least one of: the asset is located outside of the desired physical area or a current location of the asset cannot be determined, the operating the asset in the protection mode including: assessing current and projected power capabilities of the power component of the asset; assessing current and projected location information for the asset; operating the set of I/O devices based on the assessed power capabilities and location information to at least one of: minimize an inferred risk caused by the asset moving outside of the physical area or maximize an inferred probability of recovering the asset; and periodically repeating the assessing and operating actions.

A fourth aspect of the invention provides a method of deploying a movable asset, the method comprising: providing a computer system associated with the movable asset, wherein the computer system is configured to manage the movable asset by performing a method including: operating a set of input/output (I/O) devices on the asset in a default mode of operation, wherein the asset includes a power system configured to provide all power for operating devices on the asset; periodically evaluating location information for the asset during the default mode of operation; operating the asset in a protection mode of operation in response to the evaluating indicating at least one of: the asset is located outside of the desired physical area or a current location of the asset cannot be determined, the operating the asset in the protection mode including: assessing current and projected power capabilities of the power component; assessing current and projected location information for the asset; operating the set of I/O devices based on the assessed power capabilities and location information to at least one of: minimize an inferred risk caused by the asset moving outside of the physical area or maximize an inferred probability of recovering the asset; and periodically repeating the assessing and operating actions; securing the asset to a desired physical area; and initializing the computer system on the asset for operation in the desired physical area.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for managing an asset, such as a movable asset, deployed to a fixed location. Location and/or power information is periodically acquired for the asset and assessed to determine whether the asset has moved from a desired physical area and/or the power is insufficient to continue with planned operations. In response to either condition, the operation of various devices on the asset can be adjusted to minimize an estimated risk caused by the asset moving outside of the physical area and/or maximize an estimated probability of recovering the asset. The inferred risk can include consideration of one or more of: a risk of the asset being damaged; a risk of the asset damaging another object; a risk to the safety of humans/animals; a risk associated with the asset no longer collecting data according to the default operations; and/or the like. As used herein, unless otherwise noted, the term "set" means one or more (i.e., at least one) and the phrase "any solution" means any now known or later developed solution.

Figure 1:
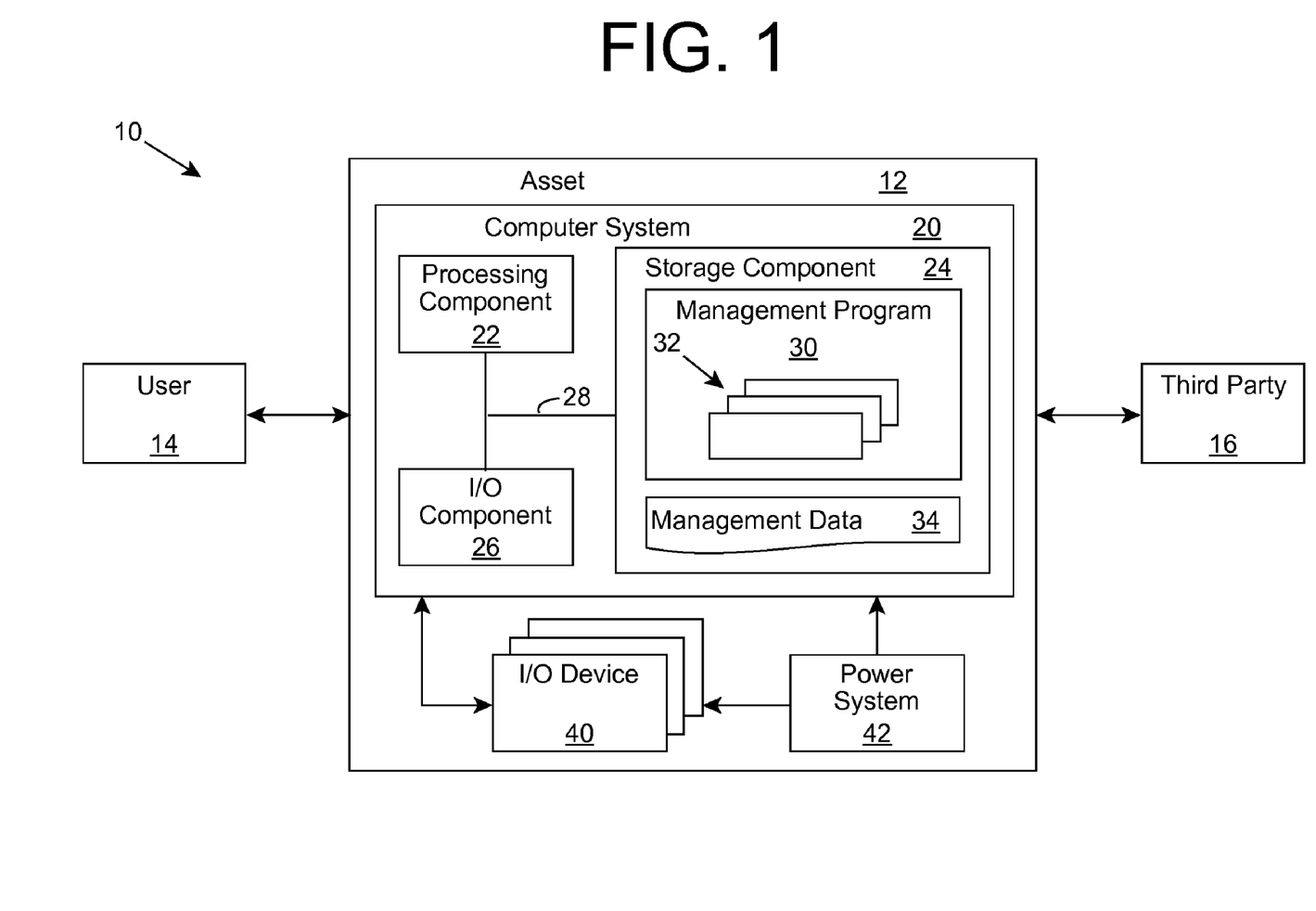
FIG. 1 shows an illustrative environment including an asset according to an embodiment.

Turning to the drawings, FIG. 1 shows an illustrative environment 10 including an asset 12 according to an embodiment. To this extent, asset 12 includes a computer system 20 that can perform a process described herein in order to manage operation of various input/output (I/O) devices 40 on the asset 12. In particular, computer system 20 is shown including a management program 30, which makes computer system 20 operable to manage operation of the I/O devices 40 by performing a process described herein. As described herein, the asset 12 can provide/receive information to/from one or more users 14 and/or third parties 16. A user 14 or third party 16 can be a human, another machine, a service provided by another computer system, and/or the like.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as management program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 14 to interact with computer system 20 and/or one or more communications devices to enable a system (e.g., machine) user 14 to communicate with computer system 20 using any type of communications link. To this extent, management program 30 can manage a set of interfaces (e.g., graphical user interface(s), application program interface, and/or the like) that enable human and/or system users 12 to interact with management program 30. Further, management program 30 can manage (e.g., store, retrieve, create, manipulate, organize, present, etc.) the data, such as management data 34, using any solution.

In any event, computer system 20 can comprise one or more general purpose computing articles of manufacture (e.g., computing devices) capable of executing program code, such as management program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, management program 30 can be embodied as any combination of system software and/or application software.

Further, management program 30 can be implemented using a set of modules 32. In this case, a module 32 can enable computer system 20 to perform a set of tasks used by management program 30, and can be separately developed and/or implemented apart from other portions of management program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of management program 30 fixed thereon (e.g., one or more modules 32). However, it is understood that computer system 20 and management program 30 are only representative of various possible equivalent computer systems that may perform a process described herein. To this extent, in other embodiments, the functionality provided by computer system 20 and management program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems, such as user 14 or third party 16, using any type of communications link. In either case, the communications link can comprise any combination of various types of wired and/or wireless links; comprise any combination of one or more types of networks; and/or utilize any combination of various types of transmission techniques and protocols.

As discussed herein, management program 30 enables computer system 20 to manage operations of a set of I/O devices 40 included on an asset 12. The asset 12 can comprise any type of asset 12 that includes various I/O devices 40 used for acquiring data regarding the environment within which the asset 12 is located. In general, the asset 12 is inherently movable. However, when deployed for operations, the asset 12 is secured within a physical area. The asset 12 can be located in water, suspended in the air, located in space, or located on land, and can be secured within the physical area using any solution. For example, a water-based asset 12 can be secured to a physical area using undersea anchor(s), sinker(s) and tether(s), and/or the like; an air-based asset 12 can be secured to a physical area using a tethered balloon, and/or the like; a space-based asset 12 can be secured to a physical area by its orbital placement and the relative gravitational pull of the asset 12 to earth, and/or the like; a land-based asset 12 can be secured to a physical area by being secured to a larger object embedded into the ground, and/or the like; etc.

The data acquired by I/O devices 40 can comprise various types of measurement data, which can vary based on the asset 12 and the corresponding application for which the asset 12 is being utilized. Illustrative measurement data can include: data regarding the environment in which the asset 12 is located, such as temperature, wind speed/direction, atmospheric pressure, humidity, presence/level of one or more compounds or contaminants, light level, visibility level, and/or the like; data regarding a body of water, such as a depth, current speed/direction, wave height, wave period, salinity, clarity, presence/level of one or more compounds or contaminants, and/or the like; etc. I/O devices 40 can acquire measurement data using any solution, and with any frequency. For example, an I/O device 40 can acquire and/or provide a measurement in response to receiving a request from computer system 20 and/or user 14, periodically according to a predefined time period, under autonomous decision making by computer system 20, and/or the like. The measurement data acquired by an I/O device 40 can comprise analog or digital data. Additionally, a group of I/O devices 40 can be configured to acquire the measurement data in serial, in parallel, synchronously, asynchronously, and/or the like. Regardless, computer system 20 can store data corresponding to the measurement data acquired by I/O device(s) 40 as management data 34.

An asset 12 also can include a location-sensing I/O device 40, which can acquire data on the location of the asset 12. In an embodiment, the location-sensing I/O device 40 comprises a global positioning system (GPS) communications device, or similar device. The location-sensing I/O device 40 can acquire two- or three-dimensional location data, which can be processed by computer system 20 to ensure that the asset 12 remains within the desired deployment area.

The set of I/O devices 40 can include one or more of various types of devices for communicating information to and/or receiving information from one or more users 14 and/or third parties 16. For example, the set of I/O devices 40 can include one or more signaling devices, such as a light (e.g., a beacon, strobe, and/or the like), a horn, and/or the like, which can signal to local third parties 16 (e.g., vessels or vehicles) the presence of the asset 12. The set of I/O devices 40 also can include one or more of various types of communications devices for transmitting data to and/or receiving data from a user 14 (e.g., the owner/operator of the asset 12) and/or one or more third parties 16. For example, the asset 12 can include a communications device, such as a wireless communications device, for communicating some or all of management data 34 (e.g., measurement data) for use by the user 14 and/or third party 16, receive modifications to management data 34 (e.g., adjustments to one or more settings for the operation of the asset 12), receive measurement data from an external data source (e.g., a syndicated data feed), and/or the like, during normal operation of the asset 12. The communications can occur periodically according to a defined schedule, in response to a query received from the user 14, under autonomous decision making by computer system 20, and/or the like.

Additionally, the set of I/O devices 40 can include communications device(s) configured to communicate an error status to the user 14 and/or one or more third parties 16. For example, the same communications device utilized during normal operation can be utilized to transmit an error status to the user 14. When the error status increases a risk to one or more other entities (e.g., vehicles, fixed assets, animals, humans, etc.), the asset 12 can communicate data regarding the error status to one or more third parties 16. For example, in a marine application, the computer system 20 can communicate information regarding the asset 12 to local marine traffic using a medium frequency (MF) radio, high frequency (HF) radio, a Global Maritime Distress and Safety System (GMDSS) device, and/or the like.

Asset 12 also can include a power system 42, which is configured to provide all power for operating devices on the asset 12. Implementation of the power system 42 can vary based on a particular application for which asset 12 is being utilized. In an embodiment, the power system 42 is configured to provide all of the power independent of any external power source (e.g., a power grid). For example, for a deployment for a fixed time period, the power system 42 can comprise a set of batteries capable of providing enough power to operate the various components of the asset 12 for the expected deployment time period. However, for an extended/indefinite period of operation, power system 42 can comprise one or more components configured to generate power from a power source of the environment within which the asset 12 is deployed. For example, illustrative power generation components include a wind turbine, a set of solar cells, a wave/current energy harvester, and/or the like. As is known, the amount of power generated by various power generation components is entirely dependent on the ambient conditions, and therefore can vary based on time of day, time of year, physical location (e.g., latitude), weather, and/or the like. To this extent, the power system 42 can include sufficient power storage to continue to operate the components of the asset 12 while power generation capabilities are lower, and can include a generation solution that is capable of re-charging the power storage while also operating the components of the asset 12.

Figure 2:
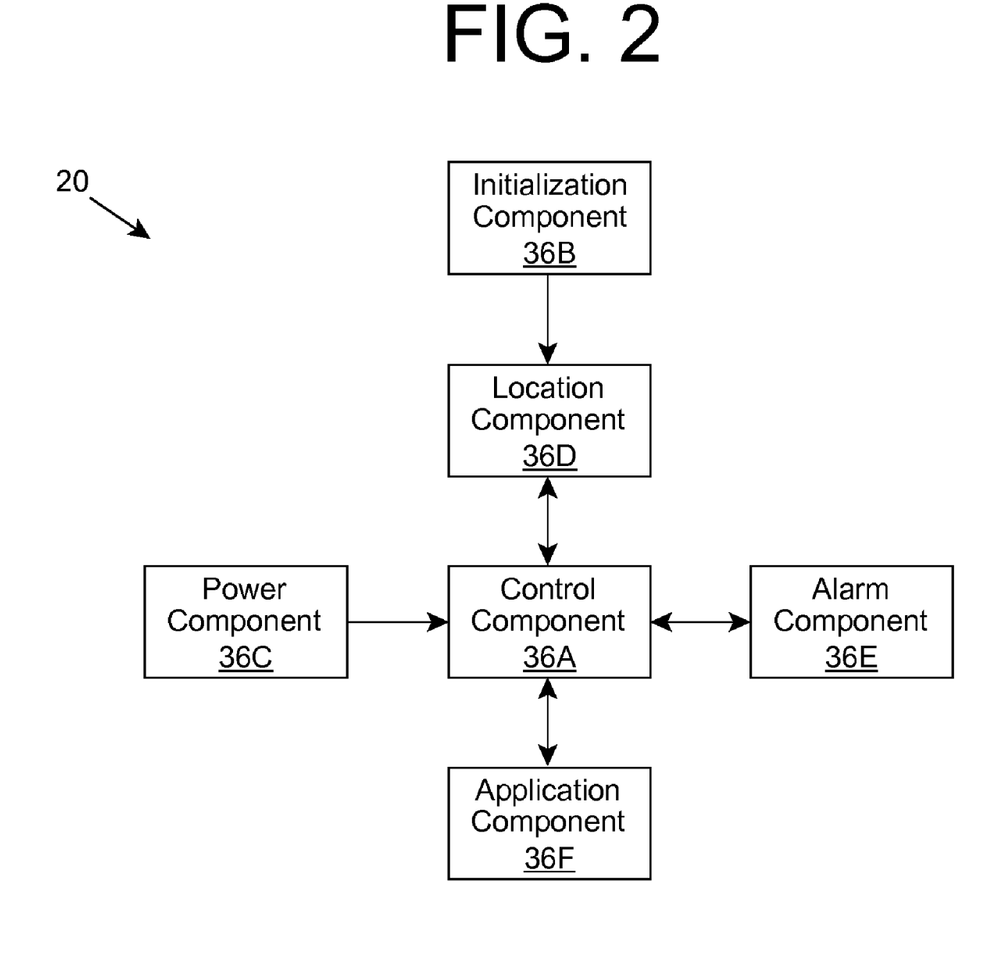
FIG. 2 shows an illustrative computer system comprising various components according to an embodiment.

In general, computer system 20 can monitor various aspects of the asset 12 and/or the environment within which the asset 12 is located, and manage operation of the set of I/O devices 40 accordingly. To this extent, FIG. 2 shows an illustrative computer system 20 comprising various components 36A-36F according to an embodiment. In general, computer system 20 can comprise a control component 36A, which is configured to receive information from various other components 36C-36F and control operation of some or all of the various other components 36C-36F, such as components 36D-36F. In particular, the control component 36A can receive data corresponding to the location of the corresponding asset 12 (FIG. 1) from a location component 36D, receive data corresponding to power generation/availability from a power component 36C, receive measurement data from an application component 36F, receive response data from an alarm component 36E, and/or the like, and process the data to manage the operation of one or more of the components 36D-36F, including providing data corresponding to any error (e.g., warning or alarm) conditions, if present, using alarm component 36E.

Figure 3:
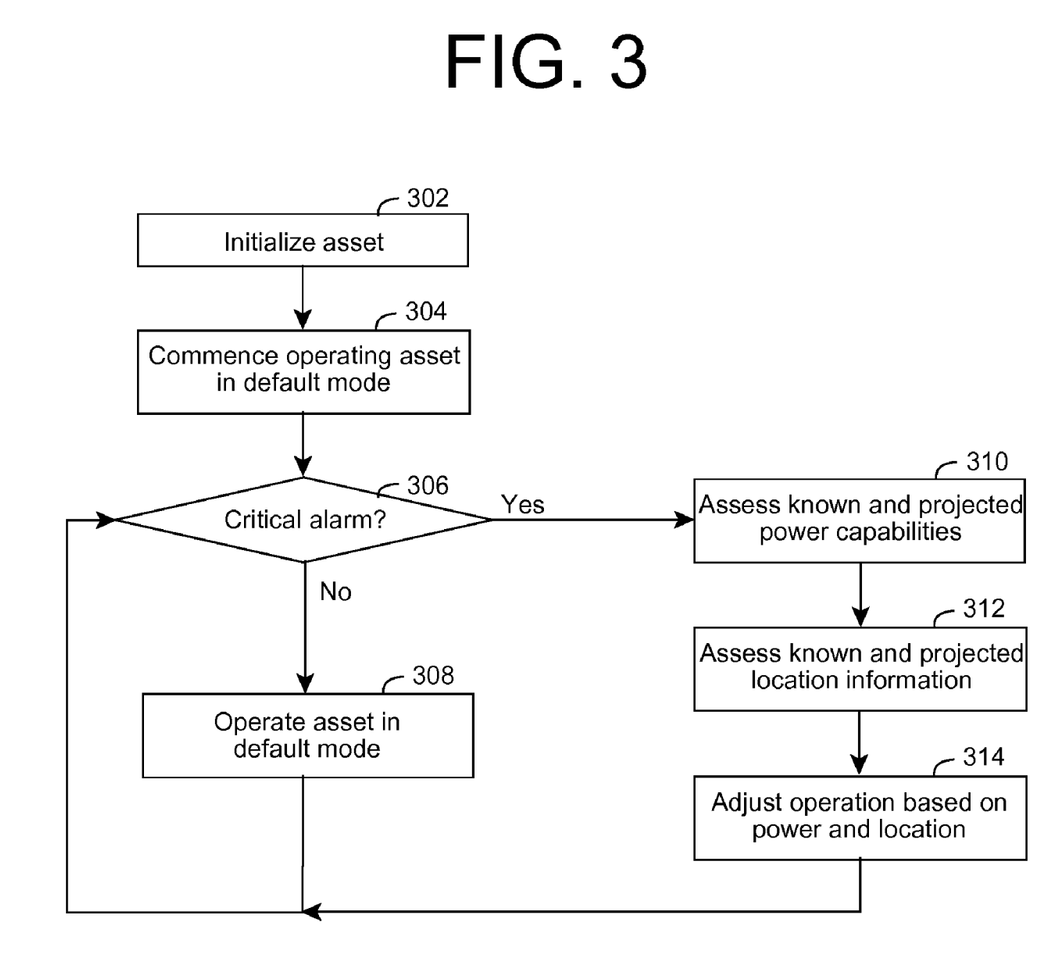
FIG. 3 shows an illustrative flow diagram for operating an asset according to an embodiment.

FIG. 3 shows an illustrative flow diagram for operating an asset 12 (FIG. 1), which can be implemented by computer system 20 (e.g., control component 36A), according to an embodiment. In action 302, computer system 20 (e.g., initialization component 36B) can be utilized to initialize the asset 12. Initialization can include performing various operations to configure the asset 12 to operate as desired in a deployment location. To this extent, initialization can include installing software, designating one or more settings, installing one or more I/O devices, and/or the like. It is understood that the various acts required for initialization can vary based on the application to which the asset 12 is directed.

Figure 4:
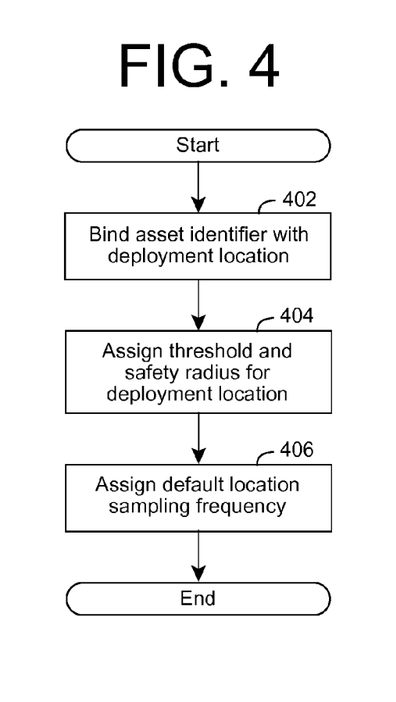
FIG. 4 shows an illustrative flow diagram for initializing an asset based on a deployment location according to an embodiment.

Additionally, one or more attributes of the initialization of the asset 12 can vary based on the deployment location. To this extent, FIG. 4 shows an illustrative flow diagram for initializing an asset 12 based on the deployment location, which can be implemented by computer system 20 (e.g., initialization component 36B), according to an embodiment. In action 402, a user 14 (FIG. 1) can bind an asset identifier corresponding to the asset 12 with a deployment location for the asset 12 using any solution. For example, user 14 can assign an asset identifier that uniquely identifies each asset 12 to be utilized for a particular application from every other asset 12 being utilized for the particular application. Additionally, the user 14 can set a setting that defines the deployment location for the asset 12. For example, the user 14 can locate the asset 12 at the deployment location and operate computer system 20 (e.g., location component 36D) to obtain data corresponding to the current location of the asset 12 from a location-sensing I/O device. Computer system 20 can store the received data as the deployment location.

In action 404, the user 14 can assign a threshold and a safety radius for the deployment location. The threshold can comprise a distance from the deployment location that is relatively close to the farthest location to which the asset 12 can move when still properly secured. The safety radius can comprise a distance from the deployment location that is beyond the farthest location to which the asset 12 can move when still properly secured. The threshold and/or safety radius can be set to account for movement of the asset 12 that can be anticipated to occur after deployment and/or an accuracy of the location data acquired by the computer system 20. In response to the asset 12 moving outside of the threshold, computer system 20 can more closely monitor the location of the asset 12 while continuing to operate the remainder of the devices of the asset 12 in their normal operating mode. In response to the asset 12 moving outside of the safety radius after deployment, computer system 20 can output an alarm and adjust operation of the asset 12 as described herein.

For a deployment in which the asset 12 is immovably secured to a fixed object (e.g., a land-based deployment to a fixed location), the threshold can be set to the accuracy of the location data, and the safety radius can be set to a value slightly larger than the accuracy of the location data, since the asset 12 will not be anticipated to move at all. However, for a deployment in which the asset 12 is fixed in a manner that allows some movement of the asset 12 (e.g., water and air deployments), the asset 12 will be anticipated to move due to current changes, wind, and/or the like, and the threshold and/or safety radius can be set accordingly. For example, if the asset 12 can be expected to move within a circle having a radius of approximately fifty feet, and the accuracy of the location data is +/− five feet, the threshold can be set to a distance of forty feet, and the safety radius can be set to a distance of sixty feet from the deployment location. In this manner, the safety radius will not generate false alarms due to movement of the asset 12 and inaccuracy of the location data.

In action 406, the user 14 can assign a default location sampling frequency for the asset 12. In an embodiment, the location sampling frequency can vary based on one or more attributes of the deployment location of the asset 12. For example, when the asset 12 is deployed in a location in which a reduced amount of power is capable of being generated, the location sampling frequency can be lower (e.g., a longer period of time between location samplings) to conserve power for the primary operations of the asset 12. Similarly, when the asset 12 is deployed in a location in which some movement of the asset 12 is anticipated (e.g., water-based location), the location sampling frequency can be higher than that used for a deployment location in which the asset 12 is not anticipated to move at all (e.g., land-based location). Still further, when the deployment location of the asset 12 is remote from a region that would endanger the asset 12 or any other assets if it becomes detached, the location sampling frequency can be lower than that used for a deployment location in which the asset 12 is close to a region in which other assets 12 are moving and/or the asset 12 could be damaged.

Returning to FIG. 3, in action 304, computer system 20 (e.g., control component 36A) can commence operating the asset 12 according to a default mode. The default mode of operation will vary based on the application. In an illustrative application, the default mode of operation will comprise computer system 20 (e.g., application component 36F) receiving and/or sending data to/from various I/O devices 40. To this extent, the default mode of operation can include one or more sensing/input devices 40 of the asset 12 acquiring data and/or one or more output devices 40 of the asset 12 sending data according to a predetermined schedule. Additionally, the default mode of operation can include the computer system 20 (e.g., location component 36D) periodically acquiring location data for the asset 12 from a location-sensing I/O device 40 based on the default location sampling frequency and/or the computer system 20 (e.g., power component 36C) periodically acquiring power data for the asset from the power system 42.

As part of the default mode of operation, computer system 20 (e.g., control component 36A) can monitor the various I/O devices of the asset 12 to determine whether they are properly operating. If computer system 20 determines that one or more I/O devices has stopped operating properly, computer system 20 can generate an alarm, which can be transmitted to an operator of the asset 12. In response, the operator can take action accordingly. For example, the operator can ignore data corresponding to the problem I/O device, schedule a repair for the asset 12, adjust one or more aspects of the default mode of operation of the asset 12, and/or the like. To the extent possible, computer system 20 can continue to operate the remaining I/O devices in the default mode of operation.

Some alarm conditions can pose a danger to the asset 12 and/or other assets that may be located near the asset 12. When such an alarm condition occurs, computer system 20 can adjust the operation of the asset 12 to a protection mode of operation, in which resources available to the asset 12 are primarily devoted to asset protection (e.g., protection of the asset from damage/causing damage, retrieval of a drifting asset, repair of the asset, public safety, and/or the like) according to a situational/conditional awareness of the asset 12. To this extent, in action 306, computer system 20 can determine whether one or more critical alarm conditions are present. For example, computer system 20 can determine whether the asset 12 has moved outside of the safety radius for the deployment location using any solution. Additionally, computer system 20 can determine whether an available amount of power and/or power generating capability is below a safety threshold using any solution. Computer system 20 also can evaluate the non-functioning of one or more devices, such as a location-sensing device, a power generation device, a communications device, and/or the like, as a critical alarm condition. When no critical alarm condition is present, in action 308, computer system 20 can operate the asset 12 in the default mode of operation.

Figure 5:
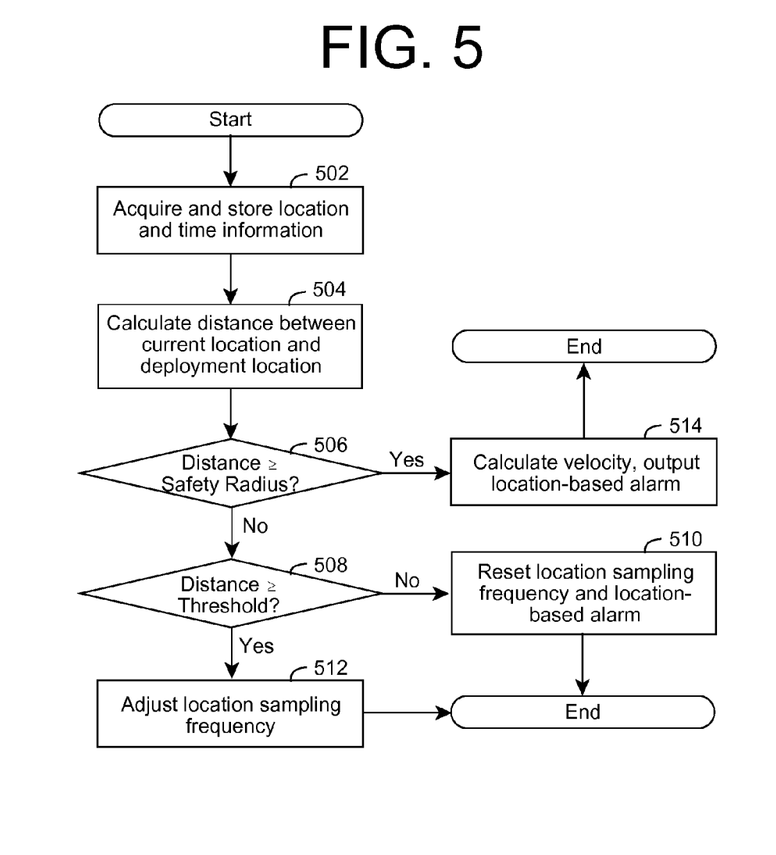
FIG. 5 shows an illustrative flow diagram for determining whether a location-based alarm condition is present according to an embodiment.

FIG. 5 shows an illustrative flow diagram for determining whether a location-based alarm condition is present, which can be implemented by computer system 20 (e.g., control component 36A), according to an embodiment. In action 502, computer system 20 can acquire location and time information using any solution. For example, control component 36A can request location and time data from location component 36D, which can acquire the data from a location-sensing I/O device 40, such as a GPS or other navigation system, configured to provide location and time data. Alternatively, control component 36A can acquire location data from location component 36D and use time data corresponding to an internal clock or the like, for computer system 20. After acquiring new location and time data, the computer system 20 can store the data for future reference. In an embodiment, computer system 20 can store the location and time data for a predetermined number of the most recent acquisitions of the data using any solution, e.g., records in a table, for further processing.

Computer system 20 can evaluate the location data acquired for the asset 12 to determine whether the asset 12 is located within the threshold and/or safety radius of the deployment location. In action 504, computer system 20 can calculate a distance between the current location and the deployment location for the asset 12. In an embodiment, computer system 20 calculates the distance based on a straight line using a standard technique for calculating the distance between two points. Depending on the application, computer system 20 can calculate the distance in two-dimensional space or three-dimensional space.

In action 506, computer system 20 can determine whether the distance is greater than or equal to the safety radius from the deployment location of the asset 12. If not, in action 508, computer system 20 can determine whether the distance is greater than or equal to the threshold from the deployment location of the asset 12. If not, in action 510, computer system 20 can operate the asset 12 according to its default mode of operation. If necessary, computer system 20 can reset a location sampling frequency to the default location sampling frequency and reset a previous location-based alarm.

When the distance exceeds the threshold but not the safety radius, in action 512, computer system 20 can adjust the location sampling frequency. To this extent, computer system 20 can increase the frequency with which the location and time information is acquired to reduce any delay in detecting movement of the asset 12 outside of the safety radius. In an embodiment, the location sampling frequency is at least doubled from the default location sampling frequency. For example, the default location sampling frequency can comprise once every fifteen minutes, while the adjusted location sampling frequency is once every five minutes.

When the distance exceeds the safety radius, in action 514, computer system 20 can calculate a velocity with which the asset 12 is moving, and output a location-based alarm. For example, computer system 20 can use the stored location and time data to calculate a speed with which the asset 12 moved between two or more acquisitions of the date and time data. Additionally, computer system 20 can determine the direction of the movement based on a plot of the location data. Computer system 20 can communicate the location-based alarm using any solution. For example, alarm component 36E can comprise one or more communications devices for communicating with an owner/operator of the asset 12, one or more governmental agencies responsible for the area within which the asset 12 is located, other assets 12 located/moving within the area, and/or the like. The corresponding communication device and/or information provided can vary based on the intended recipient. To this extent, computer system 20 can communicate the location, velocity, and operating (e.g., power availability, component operation, and/or the like) data to the owner/operator of the asset 12, location, velocity, and visual identification data to the governmental agencies, an audio and/or visual warning signal for alerting individuals operating other assets 12 within the immediate vicinity, and/or the like.

Figure 6:
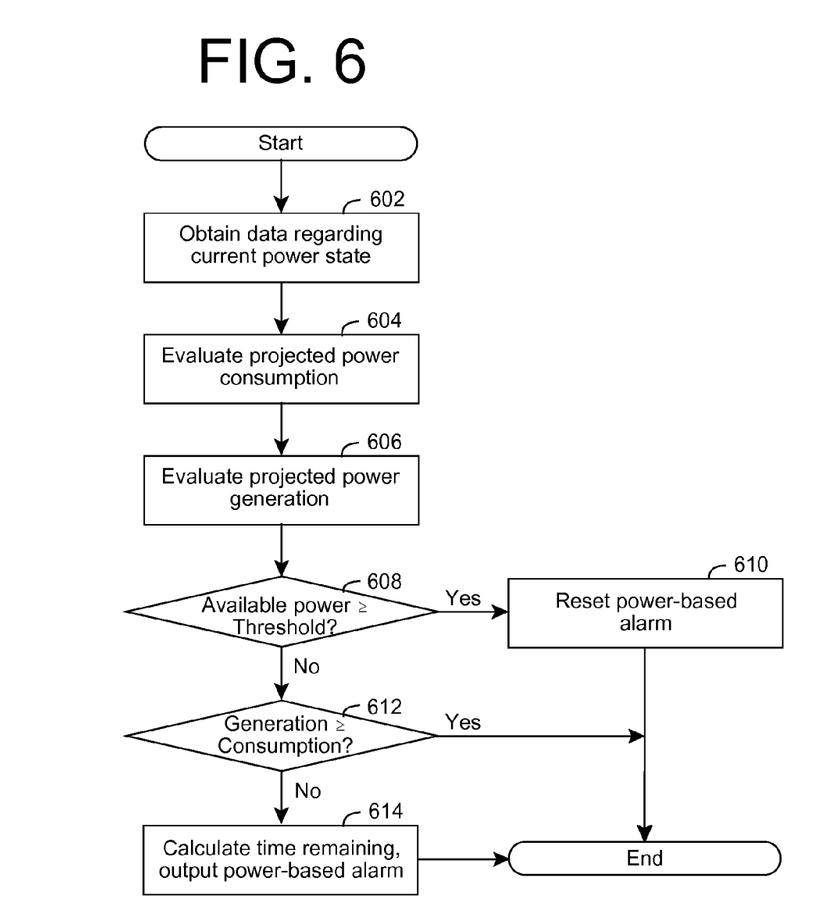
FIG. 6 shows an illustrative flow diagram for determining whether a power-based alarm condition is present according to an embodiment.

FIG. 6 shows an illustrative flow diagram for determining whether a power-based alarm condition is present, which can be implemented by computer system 20 (e.g., control component 36A), according to an embodiment. In action 602, computer system 20 can obtain power data corresponding to the current power state of the asset 12. To this extent, computer system 20 (e.g., power component 36C) can obtain power data corresponding to an amount of power currently available, an amount of power being generated, and/or the like, from the power system 42 (FIG. 1). Additionally, the power data can include data corresponding to an amount of power currently being consumed by the various I/O devices. Computer system 20 can store the power data using any solution, e.g., records in a table, for further processing.

In action 604, computer system 20 can evaluate the projected power consumption for the asset 12. For example, computer system 20 can obtain historical power consumption data for a similar time of day, a similar time of year, a similar operating state, and/or the like, for the asset 12 and/or one or more similarly configured assets (e.g., using historical power data for a fleet of assets obtained from the owner/operator of the asset 12). Computer system 20 can use the current power data to project the power consumption requirements for a future time period, a future time period for which sufficient power is currently available, and/or the like, using any solution. In an embodiment, computer system 20 can determine a difference in the current power consumption from historical power consumption data corresponding to the same operating state and time of day/year. Computer system 20 can apply the difference to historical power consumption data corresponding to a future time period to determine the projected power consumption information.

In action 606, computer system 20 can evaluate the projected power generation for the asset 12. For example, computer system 20 can obtain historical power generation data for a similar time of day, a similar time of year, similar weather/atmospheric conditions, and/or the like, for the asset 12 and/or one or more similarly configured assets (e.g., using historical power data obtained from the owner/operator of the asset 12). Computer system 20 can use the current power generation data to project the power generation for a future time period, a future time period required to generate an amount of power, and/or the like, using any solution. In an embodiment, computer system 20 can determine a difference in the current power generation from historical power generation data corresponding to the same time of day/year and similar weather/atmospheric conditions. Computer system 20 can apply the difference to historical power generation data corresponding to a future time period to determine the projected power generation information.

In action 608, computer system 20 can determine whether the currently available power is greater than or equal to a minimum power threshold. For example, computer system 20 can use a minimum power threshold equal to a fixed percentage (e.g., ten percent) of the maximum amount of power capable of being stored by the power component 36C. Alternatively, computer system 20 can use a minimum power threshold corresponding to an amount of time in which the asset 12 can operate in the default operating mode with the power currently available and/or the power projected to be available. If computer system 20 determines that the available power exceeds the power threshold, in action 610, computer system 20 can operate the asset 12 in the default operating mode and reset any power-based alarm, if necessary.

If the available power is below the threshold, in action 612, computer system 20 can determine whether current power generation exceeds current power consumption. If so, the available power should be increasing, and therefore the computer system 20 can continue with the current operating mode for the asset 12. However, if the current power consumption exceeds the generation, in action 614, computer system 20 can calculate the time remaining until the power is depleted and output a power-based alarm. Computer system 20 can communicate the power-based alarm using any solution. For example, alarm component 36E can comprise one or more communications devices for communicating with an owner/operator of the asset 12, one or more governmental agencies responsible for the area within which the asset 12 is located, and/or the like. The corresponding communication device and/or information provided can vary based on the intended recipient. To this extent, computer system 20 can communicate the operating (e.g., power availability, component operation, and/or the like) data to the owner/operator of the asset 12. If power is nearly depleted, computer system 20 can communicate to a local governmental agency indicating that the asset 12, and therefore any visual/audible warning devices that require power, is no longer functioning.

Returning to FIG. 3, when computer system 20 determines that a critical alarm condition (e.g., location or power-related alarm condition) is present in action 306, computer system 20 can alter the operation of the asset 12 to a protection mode of operation, which is configured to operate the available resources to improve the chance of recovering the asset 12, reduce the chance of damaging the asset 12 and/or other assets located near the asset 12, repair the asset 12, insure public safety, and/or the like, according to a situational and/or conditional awareness of the asset 12.

In action 310, computer system 20 can assess the known and projected power capabilities of the asset 12 (e.g., power system 42). For example, computer system 20 can determine the current power available and/or the current power being generated. Additionally, computer system 20 can evaluate one or more factors that can impact the future ability to generate power. For example, if power is being generated using a solar-based power generation approach, computer system 20 can evaluate the weather/atmospheric conditions, time of day, time of year, and/or the like, to generate a projection for future ability to generate power. The projection can account for variances to the factors that will or might occur over the relatively short term (e.g., two hours), middle term (e.g., next day), long term (next week), and/or the like. The amount of time for the long term projection can be selected based on an amount of time anticipated to elapse before the critical alarm condition can be addressed (e.g., the asset 12 can be recovered, a repair can be made to the asset 12, and/or the like). The estimated time can be set by a user 14 (FIG. 1) in response to the alarm condition, upon deployment of the asset 12, and/or the like.

In action 312, computer system 20 can assess the known and projected location information for the asset 12. If the asset 12 remains within the safety radius, computer system 20 can assume that the asset 12 remains fixed to the desired location. However, when the asset 12 is outside of the safety radius, computer system 20 can evaluate where the asset 12 is currently located and the speed and/or direction in which the asset 12 is moving. Based on the location information, computer system 20 can determine whether the asset 12 is currently located in and/or moving toward an area, such as a shipping or flight lane, shallow water, and/or the like, posing an increased threat to the asset 12 and/or other assets within the area. Additionally, computer system 20 can adjust one or more aspects of the future power generation ability of the asset 12 based on the location information. For example, if freely moving (e.g., drifting), the ability of the asset to generate power using a tidal, wind, current, and/or the like solution is likely to be substantially reduced. Similarly, if the asset 12 is moving toward a polar region, an ability to generate power using a solar-based solution will likely be adversely impacted.

Figure 7:
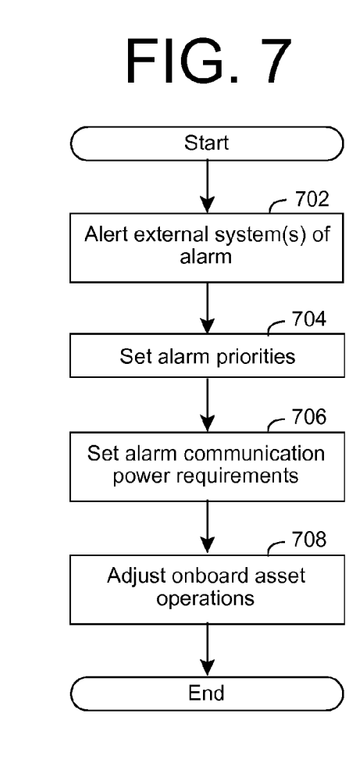
FIG. 7 shows an illustrative flow diagram for adjusting operation of an asset in response to an alarm condition according to an embodiment.

In action 314, computer system 20 can adjust operation of the various devices of the asset 12 based on the power and the location of the asset 12. For example, FIG. 7 shows an illustrative flow diagram for adjusting operation of an asset to a protection mode of operation in response to an alarm condition, which can be implemented by computer system 20 (e.g., control component 36A), according to an embodiment. In action 702, computer system 20 can communicate an alert for processing on one or more external systems (e.g., user 14 and/or a third party 16) of the alarm condition. As discussed herein, the alert can include location information, such as a current position of the asset 12, whether the asset 12 remains secured or is freely moving, if freely moving, the speed and direction of the movement, and/or the like. Additionally, the alert can include power/functionality information, such as whether any functionality is disabled, an estimated amount of time that asset 12 will remain capable of communicating, and/or the like. In any event, in response to receiving the alert, an external system (e.g., user 14 and/or third party 16) can initiate a response to the alert. The response can vary depending on the nature of the alarm condition, the corresponding risk associated therewith, and the external system receiving the alert. For example, a response can include: communicating information regarding the alarm condition to one or more individuals (e.g., a manager, a local authority, local travelers, and/or the like); allocating one or more assets to search for, recover, repair, replace, and/or the like, the asset 12; providing instructions, information, and/or the like, to the computer system 20 for use in managing the asset 12; and/or the like.

In action 704, computer system 20 can prioritize the various alarms that may need to be communicated. For example, for a location-based alarm, alarms that may require communication include: a local alarm (e.g., flashing a signal beacon, sounding an audible alarm, and/or the like) to alert local traffic that may be traveling where the asset 12 is drifting; a local authority alarm (e.g., communicated over a monitored navigational channel) indicating that the asset 12 is drifting, its location, where it is anticipated to be located, physical attributes of the asset 12 (e.g., size, color, markings, radar reflector, a photograph, and/or the like), and/or the like, to enable the local authority to alert local traffic and/or monitor the area; an operator alarm (e.g., communicated over a private communications channel) indicating that the asset 12 is drifting, its location, where it is anticipated to be located, operational capabilities, power capabilities, and/or the like, to assist in the recovery of the asset 12; and/or the like.

Depending on the current location of a drifting asset 12 and other factors, such as time of day, weather, and/or the like, the various types of alarms can be assigned a corresponding priority. The priority can indicate the relative importance of the alarm to ensuring a safe recovery of the asset 12. For example, when the asset 12 is drifting within a heavily traveled area, the asset 12 can assign a high priority to the local alarm, a medium priority to the local authority alarm, and a low priority to the operator alarm. Alternatively, when the asset 12 is drifting in a lightly/non-traveled area, the asset can assign a high priority to the operator alarm, a medium priority to the local alarm (to account for any sporadic travelers that may be present), and a low priority to the local authority alarm (since a local authority may not be present and/or may not take any action in response).

In action 706, computer system 20 can set the alarm communication power requirements. In particular, computer system 20 can set the communication power requirements to ensure that sufficient power remains available to perform desired communications for as long as possible and/or required. Computer system 20 can set the communication power requirements according to the alarm types and priorities and the available power and projected power availability.

If power generation is not a concern, computer system 20 can set a high priority local alarm to be transmitted with a high frequency (e.g., once every thirty seconds), a medium priority local authority alarm to be transmitted with a medium frequency (e.g., once every hour, and/or the like), and a low priority operator alarm to be transmitted with a low frequency (e.g., twice a day). It is understood that the relative frequency of transmission between high and low frequency can vary based on the type of alarm. For example, the frequency of a local alarm can be set to once every thirty seconds when it is a high priority, down to once every two minutes when it is a low priority, while the frequency of transmissions to a local authority or an operator can vary from once every hour for a high priority to once a day for a low priority. Regardless, it is understood that these ranges of frequencies are only illustrative.

While the frequency is primarily discussed in terms of time, the frequency also can be evaluated based on the distance traveled from a previously reported location. The distance can vary based on the priority level of the alarm. For example, for a medium priority local authority alarm, the computer system 20 can communicate an alarm after the asset 12 moves at least one hundred yards from a previously reported location. For a low priority local authority alarm, the distance can be a half mile or more.

When power generation/availability is a concern, the frequencies can be adjusted to extend the operating life of the location device(s) and/or communications device(s) for the asset 12 for a desired period of time. To this extent, the frequency of transmission for one or more of the alarms can be lowered to reduce the power requirements for the alarms. Computer system 20 can recalculate the alarm communication power requirements and determine an expected operating life based on the power anticipated to be available.

When insufficient power is available to continue operating the location device(s) and/or communications device(s) for the asset 12 for a sufficient period of time, computer system 20 can operate in a sleep mode, in which minimal devices are operating for a certain amount of time. For example, computer system 20 can shut down all devices with the exception of a device configured to receive communications from the user 14 (e.g., owner or operator) of the asset 12. In response to a communication, the computer system 20 can retrieve and report its current position before returning to sleep mode.

In action 708, computer system 20 can adjust the operation of the various devices on the asset 12 based on the previous assessments of the location of the asset 12, movement of the asset 12, the alarm communications power requirements, the available power, various aspects of the environment around the asset 12, and/or the like. In particular, if necessary, computer system 20 can shut down one or more I/O devices that manage data for the application to which the asset 12 is directed in order to conserve power, eliminate the collection and processing of potentially faulty or irrelevant data, and/or the like. Alternatively, when sufficient power is available, computer system 20 can use the data from one or more of the I/O devices to adjust the operations of the asset 12 in order to reduce the risk to the asset 12 and/or improve the chances for recovery of the asset 12. For example, computer system 20 can continue to operate a device configured to sense an amount of light and use the data to project an ability to generate power using a solar-based power generation solution, adjust a frequency that a local alarm is communicated (e.g., using a beacon, audible alert, and/or the like), etc. Similarly, computer system 20 can continue to operate a device configured to sense an amount and direction of wind to project an ability to generate power using a wind-based power generation solution, project future movement and/or location for the asset 12, predict changes to the weather, and/or the like.

In an illustrative application, the asset 12 comprises a buoy, which is configured to collect various environmental data for a particular water location (e.g., river, lake, ocean, sea, and/or the like) and/or generate power (e.g., from waves, current, wind, and/or the like) at the particular water location. In either case, as part of initialization of the asset 12, the asset 12 can be fixed to a location. The asset 12 can be one of many similar assets 12 located, for example, in an offshore "farm." The asset 12 may drift from the location due to a broken mooring/tether, a dragging anchor, collision from another vessel or other object, severe weather, and/or the like. Should this occur, the asset 12 can pose an extreme risk to ships (e.g., by moving into a shipping lane or away from a navigation chart position) and other structures (e.g., other assets in the farm, offshore oil platform, bridges, docks, etc.) that are in the area. Additionally, the asset 12 itself may be at risk of damage or loss, e.g., due to an inability to locate and/or secure the asset 12. Still further, the inability of the asset 12 to provide accurate data, e.g., when monitoring critical parameters for a specific location (e.g., as part of a tsunami warning system, or the like), may present an additional risk.

The asset 12 can include standard technology, such as GPS, to periodically monitor the location and detect when the asset 12 has moved outside of a safe area (e.g., the safety radius described herein). The computer system 20 can adjust the monitoring frequency based on one or more environmental conditions. For example, in calm, sunny weather, the monitoring frequency can be relatively low (e.g., once an hour or more), whereas in high winds, heavy seas, extreme temperatures, strong currents, and/or the like, computer system 20 can set the monitoring frequency to a relatively high frequency (e.g., once every five minutes or less). In addition to environmental conditions, computer system 20 can consider other factors, such as available/projected power and the corresponding power demands for acquiring location data, in setting the monitoring frequency.

The computer system 20 can adjust the operation of various onboard systems and devices in response to a detected critical error condition. Illustrative critical error conditions include the buoy moving outside of the safety radius, the current/projected available power being insufficient to perform a set of desired operations, an inability to acquire location data (e.g., the GPS system is not functioning), and/or the like. In particular, the computer system 20 can autonomously or semi-autonomously adjust operation of the various onboard devices to maximize the probability of preserving the asset 12 based on the available context information of the physical environment in which the asset 12 is located and any predictable changes in the environment that can change the associated risks.

For example, when the buoy moves outside of the safety radius (a location-based critical error condition), the computer system 20 can determine the available power on board, stop all non-essential functions (e.g., sensor recordings, if they are not critical), determine a risk associated with the current position of the asset 12 (e.g., is it near a shipping lane, a populated area, a bridge, etc.), calculate its expected track/course based on known water conditions and weather (e.g., currents, wind, waves, etc.), and/or the like. Based on this analysis, the computer system 20 can determine a communications and operations plan. For example, if the buoy is in a critical area, like a shipping lane, the computer system 20 communicate the position and expected track of the asset 12 to a local authority relatively frequently, e.g., every fifteen minutes or less, increase the frequency with which a navigational beacon is flashed, and/or the like. However, if the computer system 20 calculates a less risky path based on its position and determines that the available power is low, and an ability to generate power is currently low (e.g., it is night and power is generated by solar panels), the computer system 20 can halt the functioning of all onboard devices, communicate a message to a local authority and/or owner/operator, and go to sleep mode with a programmed wake up time after several hours. When the wake up time arrives, the computer system 20 can wake up to check and report the position of the asset 12 before returning to sleep mode. When the buoy includes critical sensors for performing, for example, a vital security function, the continued operation of these sensors may be desirable even as the buoy is drifting. In this case, computer system 20 can take into account the relative risks associated with stopping the sensors versus increasing position-based monitoring and communications in determining a monitoring and communications strategy.

As a result, computer system 20 enables an asset 12 to have context awareness, and to automatically adjust onboard operations based on the context. When communications with an operator/owner are possible, the computer system 20 can receive instructions and/or additional data from the operator/owner and/or a third party, which can further enhance the context awareness. For example, the computer system 20 can receive weather forecasts (e.g., from a syndicated meteorological service), additional historical data, an estimated time before retrieval is possible, and/or the like, which can be utilized by computer system 20 to optimize the operations of the various onboard devices. During a communications failure, computer system 20 can implement high-integrity messaging technology to ensure that no messages are lost. For example, computer system 20 can store all position coordinates and drift vectors in a message queue, and transmit the messages without loss when communications are re-established with the operator/owner of the asset 12. Furthermore, alternative communications channels can be utilized when one communications channel fails or is otherwise unavailable (e.g., requires too much power).

While shown and described herein as a method and system for managing a movable asset 12, it is understood that aspects of the invention further provide various alternative embodiments. For example, in one embodiment, the invention provides a computer program fixed in at least one computer-readable storage medium, which when executed, enables a computer system to manage a movable asset 12. To this extent, the computer-readable storage medium includes program code, such as management program 30 (FIG. 1), which implements some or all of a process described herein. It is understood that the term "computer-readable storage medium" comprises one or more of any type of tangible medium of expression, now known or later developed, from which a copy of the program code can be perceived, reproduced, or otherwise communicated by a computing device. For example, the computer-readable storage medium can comprise: one or more portable storage articles of manufacture; one or more memory/storage components of a computing device; paper; and/or the like.

In another embodiment, the invention provides a method of providing a copy of program code, such as management program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable storage medium. In either case, the set of data signals can be transmitted/received using any type of communications link.

In still another embodiment, the invention provides a method of generating a movable asset 12 (FIG. 1) configured as described herein. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like. The computer system can be installed on the asset 12 and integrated with the various I/O devices, power system, etc. on the asset 12.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing an asset, the method comprising:
   operating a set of input/output (I/O) devices on the asset in a default mode of operation using a computer system located on the asset, wherein the asset is secured to a desired physical area and includes a power system configured to provide all power for operating devices on the asset;
   periodically evaluating location information for the asset using the computer system during the default mode of operation; and
   operating the asset in a protection mode of operation using the computer system in response to the evaluating indicating at least one of: the asset is located outside of the desired physical area or a current location of the asset cannot be determined, the operating the asset in the protection mode including:
      assessing current and projected power capabilities of the power component of the asset;
      assessing current and projected location information for the asset;
      operating the set of I/O devices on the asset based on the assessed power capabilities and location information to at least one of: minimize an inferred risk caused by the asset moving outside of the physical area or maximize an inferred probability of recovering the asset; and
      periodically repeating the assessing and operating actions.

2. The method of claim 1, further comprising periodically evaluating the current and projected power capabilities of the power component of the asset using the computer system during the default mode of operation, wherein the operating the asset in the protection mode of operation is further performed in response to the evaluated power capabilities being insufficient for the default mode of operation.

3. The method of claim 1, wherein at least one of the assessing actions includes assessing a set of attributes of the environment within which the asset is located.

4. The method of claim 1, wherein the periodically evaluating location information during the default mode of operation includes increasing a frequency of the evaluating in response to the evaluating indicating the asset is located more than a threshold distance from a deployment location.

5. The method of claim 1, wherein the operating the set of I/O devices in the protection mode of operation includes:
   adjusting a frequency with which at least one sensing device on the asset acquires data based on the assessed power capabilities and a relative importance of the data acquired by the sensing device; and
   periodically communicating a set of alarms for processing by at least one external system.

6. The method of claim 5, wherein the set of alarms includes a plurality of types of alarms, and wherein the periodically communicating includes:
   setting a relative priority for each type of alarm based on the assessed location information; and
   setting a relative frequency for communicating each type of alarm based on the relative priority and the assessed power capabilities.

7. The method of claim 1, wherein the operating the asset in a protection mode of operation further includes assessing an amount of time until the asset can be recovered, wherein the operating the set of I/O devices in the protection mode of operation is further based on the amount of time.

8. A system comprising:
   an asset secured to a desired physical area;
   a set of input/output (I/O) devices associated with the asset;
   a power system associated with the asset, wherein the power system is configured to provide all power for operating devices associated with the asset; and
   a computer system including at least one computing device associated with the asset, wherein the computer system is configured to manage the asset by performing a method including:
      operating the set of I/O devices in a default mode of operation;
      periodically evaluating location information for the asset during the default mode of operation; and
      operating the asset in a protection mode of operation in response to the evaluating indicating at least one of: the asset is located outside of the desired physical area or a current location of the asset cannot be determined, the operating the asset in the protection mode including:
         assessing current and projected power capabilities of the power component;
         assessing current and projected location information for the asset;
         operating the set of I/O devices based on the assessed power capabilities and location information to at least one of: minimize an inferred risk caused by the asset moving outside of the physical area or maximize an inferred probability of recovering the asset; and
         periodically repeating the assessing and operating actions.

9. The system of claim 8, the method further including periodically evaluating the current and projected power capabilities of the power component during the default mode of operation, wherein the operating the asset in the protection mode of operation is further performed in response to the evaluated power capabilities being insufficient for the default mode of operation.

10. The system of claim 8, wherein the set of I/O devices includes a set of sensing devices, each sensing device configured to acquire data corresponding to at least one attribute of the environment within which the asset is located.

11. The system of claim 10, wherein at least one of the assessing actions includes assessing the data corresponding to a set of attributes of the environment within which the asset is located.

12. The system of claim 8, wherein the operating the set of I/O devices in the protection mode of operation includes:
   adjusting a frequency with which at least one sensing device on the asset acquires data based on the assessed power capabilities and a relative importance of the data acquired by the sensing device; and
   periodically communicating a set of alarms for processing by at least one external system.

13. The system of claim 12, wherein the set of alarms includes a plurality of types of alarms, and wherein the periodically communicating includes:
   setting a relative priority for each type of alarm based on the assessed location information; and
   setting a relative frequency for communicating each type of alarm based on the relative priority and the assessed power capabilities.

14. The system of claim 8, wherein the operating the asset in a protection mode of operation further includes assessing an amount of time until the asset can be recovered, wherein the operating the set of I/O devices in the protection mode of operation is further based on the amount of time.

15. The system of claim 8, wherein the set of I/O devices include a location-sensing I/O device, the system further comprising a navigation system configured to provide location data to the location-sensing I/O device.

16. The system of claim 8, wherein the operating the set of I/O devices in the protection mode of operation includes communicating an alert, the system further comprising at least one device configured to receive the alert and initiate a response to the alert.

17. A computer-readable storage medium comprising program code embodied therein, which when executed, causes a computer system to implement a method of managing an asset, the method comprising:
   operating a set of input/output (I/O) devices on the asset in a default mode of operation, wherein the asset is secured to a desired physical area and includes a power system configured to provide all power for operating devices on the asset;
   periodically evaluating location information for the asset during the default mode of operation;
   operating the asset in a protection mode of operation in response to the evaluating indicating at least one of: the asset is located outside of the desired physical area or a current location of the asset cannot be determined, the operating the asset in the protection mode including:
      assessing current and projected power capabilities of the power component of the asset;
      assessing current and projected location information for the asset;
      operating the set of I/O devices based on the assessed power capabilities and location information to at least one of: minimize an inferred risk caused by the asset moving outside of the physical area or maximize an inferred probability of recovering the asset; and
      periodically repeating the assessing and operating actions.

18. The computer-readable storage medium of claim 17, the method further comprising periodically evaluating the current and projected power capabilities of the power component during the default mode of operation, wherein the operating the asset in the protection mode of operation is further performed in response to the evaluated power capabilities being insufficient for the default mode of operation.

19. The computer-readable storage medium of claim 17, wherein at least one of the assessing actions includes assessing a set of attributes of the environment within which the asset is located.

20. The computer-readable storage medium of claim 17, wherein the operating the set of I/O devices in the protection mode of operation includes:
   adjusting a frequency with which at least one sensing device on the asset acquires data based on the assessed power capabilities and a relative importance of the data acquired by the sensing device; and
   periodically communicating a set of alarms for processing by at least one external system.

21. The computer-readable storage medium of claim 20, wherein the set of alarms includes a plurality of types of alarms, and wherein the periodically communicating includes:
   setting a relative priority for each type of alarm based on the assessed location information; and
   setting a relative frequency for communicating each type of alarm based on the relative priority and the assessed power capabilities.

22. The computer-readable storage medium of claim 17, wherein the operating the asset in a protection mode of operation further includes assessing an amount of time until the asset can be recovered, wherein the operating the set of I/O devices in the protection mode of operation is further based on the amount of time.

23. A method of deploying a movable asset, the method comprising:
   providing a computer system associated with the movable asset, wherein the computer system is configured to manage the movable asset by performing a method including:
      operating a set of input/output (I/O) devices on the asset in a default mode of operation, wherein the asset includes a power system configured to provide all power for operating devices on the asset;
      periodically evaluating location information for the asset during the default mode of operation;
      operating the asset in a protection mode of operation in response to the evaluating indicating at least one of: the asset is located outside of the desired physical area or a current location of the asset cannot be determined, the operating the asset in the protection mode including:
         assessing current and projected power capabilities of the power component;
         assessing current and projected location information for the asset;
         operating the set of I/O devices based on the assessed power capabilities and location information to at least one of: minimize an inferred risk caused by the asset moving outside of the physical area or maximize an inferred probability of recovering the asset; and
         periodically repeating the assessing and operating actions;
   securing the asset to a desired physical area; and
   initializing the computer system on the asset for operation in the desired physical area.

* * * * *